United States Patent [19]

Ito et al.

[11] Patent Number: 5,315,402
[45] Date of Patent: May 24, 1994

[54] VIDEO SIGNAL RECORDING/REPRODUCING SYSTEM FOR INCREASING RECORDING DENSITY OF A FREQUENCY MODULATED SIGNAL

[75] Inventors: Yasuyuki Ito, Tokyo; Takeshi Kawabe, Asaka; Yukio Tojo; Takeo Takase, both of Kashiwa, all of Japan

[73] Assignee: Sharp Kabushiki Kaisha, Osaka, Japan

[21] Appl. No.: 932,748

[22] Filed: Aug. 25, 1992

Related U.S. Application Data

[63] Continuation of Ser. No. 561,682, Aug. 2, 1990, abandoned.

[30] Foreign Application Priority Data

| Aug. 2, 1989 | [JP] | Japan | 1-200840 |
| Dec. 21, 1989 | [JP] | Japan | 1-333810 |
| Mar. 15, 1990 | [JP] | Japan | 2-67588 |
| Jul. 5, 1990 | [JP] | Japan | 2-178793 |

[51] Int. Cl.$^5$ .......................... H04N 5/85; G11B 11/18
[52] U.S. Cl. ........................ 358/342; 369/116; 369/106
[58] Field of Search .......... 358/335, 342, 330; 369/106, 116, 124, 32, 48, 49, 50; H04N 5/85

[56] References Cited

U.S. PATENT DOCUMENTS

| 3,701,846 | 10/1972 | Zenzefilis | 178/66 DD |
| 4,243,849 | 1/1981 | Goshima et al. | 358/342 |
| 4,796,097 | 1/1989 | Mashimo | 358/330 |
| 4,813,034 | 3/1989 | Mashimo | 369/116 |
| 4,937,809 | 6/1990 | Miyadera et al. | 369/106 |

FOREIGN PATENT DOCUMENTS

| 0089021 | 9/1983 | European Pat. Off. |
| 59-117743 | 7/1984 | Japan |
| 59-140634 | 8/1984 | Japan |
| 59-227040 | 12/1984 | Japan |
| 60-140551 | 7/1985 | Japan |
| 60-212092 | 10/1985 | Japan |
| 61-059605 | 3/1986 | Japan |

OTHER PUBLICATIONS

W. van den Bussche et al. —"Signal Processing in the Philips 'VLP' System" in *Philips Technical Review* pp. 182–185 (1973), Rev. 33, No. 7.

*Primary Examiner*—Tommy P. Chin
*Assistant Examiner*—Huy Nguyen

[57] ABSTRACT

A video signal recording/reproducing device has at least a frequency modulating unit which FM modulates information to be recorded on an optical disk memory, a laser driving pulse generating unit for generating a laser driving pulse derived from the frequency-modulated signal generated by the frequency modulating unit and for modifying the duty factor of the laser driving pulse in accordance with the linear velocity of the optical disk memory where recording is taking place; and a recording unit for controlling the laser power during recording to an optimum value in accordance with the linear velocity of the optical disk memory where recording is taking place. This arrangement enables reduction of the minimal length of recording bits resulting in reproduced signals of a level sufficient for obtaining reproduced images of a fine quality addition enables increase of the recording capacity of the optical disk memory.

7 Claims, 17 Drawing Sheets

(a) FREQUENCY-MODULATED SIGNAL AND SLICING LEVEL (b) LASER DRIVING PULSE

VIDEO SIGNAL RECORDING/REPRODUCING SYSTEM FOR INCREASING RECORDING DENSITY OF A FREQUENCY MODULATED SIGNAL

This application is a continuation of application Ser. No. 07/561,682 filed on Aug. 2, 1990, now abandoned.

FIELD OF THE INVENTION

The present invention relates to a video signal recording/reproducing device capable of recording and reproducing video signals on an optical memory to be used as a large capacity memory.

BACKGROUND OF THE INVENTION

Magnetic tape, optical disk memory and other mediums, are commonly used recording mediums for recording/reproducing video signals or other signals. Recently, optical disk memories in which handling is simple and operation is excellent, has been used for a variety of tasks.

Different types of optical disk memory are known;

the Read-Only type optical disk memory, where information is recorded during the manufacturing stage of the optical disk memory, such as for instance compact disks, laser video disks, etc., the Direct Read After Write type optical disk memory where information can be recorded only once, such as the perforated type memory employing Te-C or other material as a recording layer, and the Rewritable type optical disk memory where information can be recorded and reproduced as many times as desired, such as the magneto-optical disk, and the like.

Recording on a Read-Only type optical disk memory, for example, is performed as follows. First, the original disk is cut by means of an Ar laser or other laser thereby forming a recording master. Then, recording pits are reproduced from the recording master on a plastic substrate through an injection molding method or other method. Meanwhile, recording and reproduction on DRAW type and Rewritable type optical disk memories are performed through a laser light that is emitted by a semiconductor laser or other member housed in a recording/reproducing device.

The recording area of such an optical disk memory is limited. Therefore, in order to increase the recording capacity, the recording density needs to be increased as much as possible. However, when recording/reproducing video signals, for example the level of the reproduced signals needs to be above a given value in order to ensure reproduced images of a satisfactory quality. In other words, the signal-to-noise ratio (hereinafter, referred to as S/N) of the reproduced images needs to be above a given value. The recording capacity of the optical disk memory is thus determined by the minimal length of the recording bits permitting to obtain reproduced signals of an amplitude above the given value. Here, the length of the recording bits extends along the direction of recording tracks formed on the optical disk memory. Accordingly, in order to increase the recording capacity of the optical disk memory without causing a drop in the level of the reproduced signals, the recorded density needs to be enhanced by reducing the minimal length of the recording bits.

Suppose now that video signals are recorded on optical disk memory after having gone through an FM process. When the length of the recording bits is smaller than the radius of a light spot (that depends on the wavelength of the laser light emitted by the Ar laser, the semiconductor laser or other laser) formed as a converging beam irradiated on a recording track, the level of the reproduced signals suddenly drops thereby causing the quality of the reproduced images to lower. In conventional devices, the minimal bit length permitted for recording bits to be recorded/reproduced and to have a satisfactory reproduction performance, is approximately equal to 0.5 $\mu$m for a Read-Only type optical disk memory, and approximately equal to 1 $\mu$m for DRAW type and Rewritable type optical disk memories.

Reducing the pitch of the tracks formed on the optical disk memory might be considered as means for enhancing the recording density. However, if the pitch of the tracks is reduced so as to be approximately equal to the radius of the light spot, crosstalk occurs between adjacent tracks. The smallest track pitch possible is thus approximately equal to 1.6 $\mu$m, i.e. the track pitch commonly adopted.

For the above reasons, in conventional devices the recording time of, for example, a 300 mm Read-Only type laser disk that rotates at Constant Angular Velocity (hereinafter referred to as CAV) at a speed of 1800 rpm, is relatively short, especially when video signals that contain a large amount of data are recorded, and is equal to about only 30 minutes. The recording time for a 200 mm laser disk is even shorter and is approximately equal to about 14 minutes with the CAV method, and about 18 minutes with the Constant Linear Velocity (hereinafter referred to as CLV) method.

As described above, with the conventional technology, the recording density cannot be satisfactorily increased by reducing the length of the recording bits or the pitch of the tracks. Conventional technology thus does not offer a long recording time, especially when video signals that contain a large amount of data are recorded.

SUMMARY OF THE INVENTION

An object of the present invention is to provide a video signal recording/reproducing device capable of increasing the recording capacity of an optical disk memory.

In order to achieve the above object, a video signal recording/reproducing device in accordance with the present invention is characterized as including at least a frequency modulator wherein information to be recorded on an optical disk memory goes through an FM process, and a laser driving pulse generator means that generates a laser driving pulse, based on the frequency-modulated signal that was modulator in the frequency modulating and that modifies the duty factor of the laser driving pulse in accordance with the linear velocity at the part of the optical disk memory where recording is being performed.

With the above arrangement, the laser driving pulse generator compares the frequency-modulated signal that was modulated in the frequency modulator with a predetermined slicing level corresponding to the linear velocity of the part on the optical disk memory where recording is taking place, and subsequently converts the frequency-modulated signal into a binary signal. The laser driving pulse generator then generates a laser driving pulse whose pulse width is such that, when the above linear velocity is relatively small, the duty factor (i.e. the numeric value representing in percentage the ratio of the pulse width to the pulse cycle) of the laser driving pulse is less than 50%. Here, the laser power is set such as to be greater than in the conventional device causing the axis in a radial direction perpendicular to the direction of the recording tracks of the recording bits to be enlarged. The recording bits that used to be formed in the shape of an ellipse extending in the recording tracks direction in the conventional device, have thus an approximately round shape whereby the amplitude of the reproduced signals is increased. This arrangement thus enables reduction of the minimal length of recording bits which ensures reproduced signals of a level sufficient for obtaining a fine reproduced image quality. As a result, when the optical disk memory is driven at CAV, a video signal recording/reproducing device in accordance with the present invention, permits areas located on inner portion of the optical disk memory to be recorded, as into contrast conventional devices. In addition, when the CLV method is adopted, the linear velocity, may be slowed as compared to the conventional device. The recording capacity of the optical disk memory may be thus increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 1 to FIG. 7 illustrate a first embodiment of the present invention.

FIG. 1 is a block diagram illustrating in detail the configuration of a laser driving pulse generating means.

FIG. 3 is a graph illustrating the relation between the signal-to-noise ratio of reproduced signals and the duty factor of the laser driving pulse when signals of a single frequency are recorded.

FIG. 4 is a block diagram illustrating the configuration of essential parts of a recording section.

FIG. 5 is a block diagram illustrating the configuration of essential parts of a reproducing section.

FIG. 6 is a block diagram illustrating in detail the configuration of the recording section.

FIG. 7 is a block diagram illustrating in detail the configuration of the reproducing section.

FIG. 8 is a block diagram illustrating in detail the configuration of laser driving pulse generating means.

FIG. 9 is a time chart of the waves generated in different sections of the laser driving pulse generating means.

FIG. 10 is a graph illustrating the relation between the amplitude of reproduced signals and the duty factor of the laser driving pulse when signals of a single frequency are recorded, and shows the results of measurements taken at different recording positions.

FIG. 11 is a graph illustrating the relation between the optimum laser power and the duty factor of the laser driving pulse during recording, and shows the results of measurements taken at different recording positions.

FIG. 12 is a graph illustrating the relation between the signal-to-noise ratio of reproduced signals and the duty factor of the laser driving pulse during recording when signals of a single frequency are recorded, and shows the results of measurements taken at different recording positions.

FIG. 13 is a block diagram illustrating essential parts of a recording section.

FIG. 14 is a block diagram illustrating in detail the configuration of the recording section.

FIG. 15 is a block diagram illustrating in detail the configuration of laser driving pulse generating means.

FIG. 16 is a timing chart of waves generated in different sections of the laser driving pulse generating means.

FIG. 17 is a graph illustrating the relation between the optimum laser power and the square root of the linear velocity of the disk when signals of a single frequency are recorded, and shows the result of measurements obtained when changing the duty factor of the laser driving pulse.

FIG. 18 is a block diagram illustrating the configuration of essential parts of a recording section.

DESCRIPTION OF THE EMBODIMENTS

A first embodiment of the present invention will be described hereinbelow with reference to FIG. 1 to FIG. 7.

Figure 4:
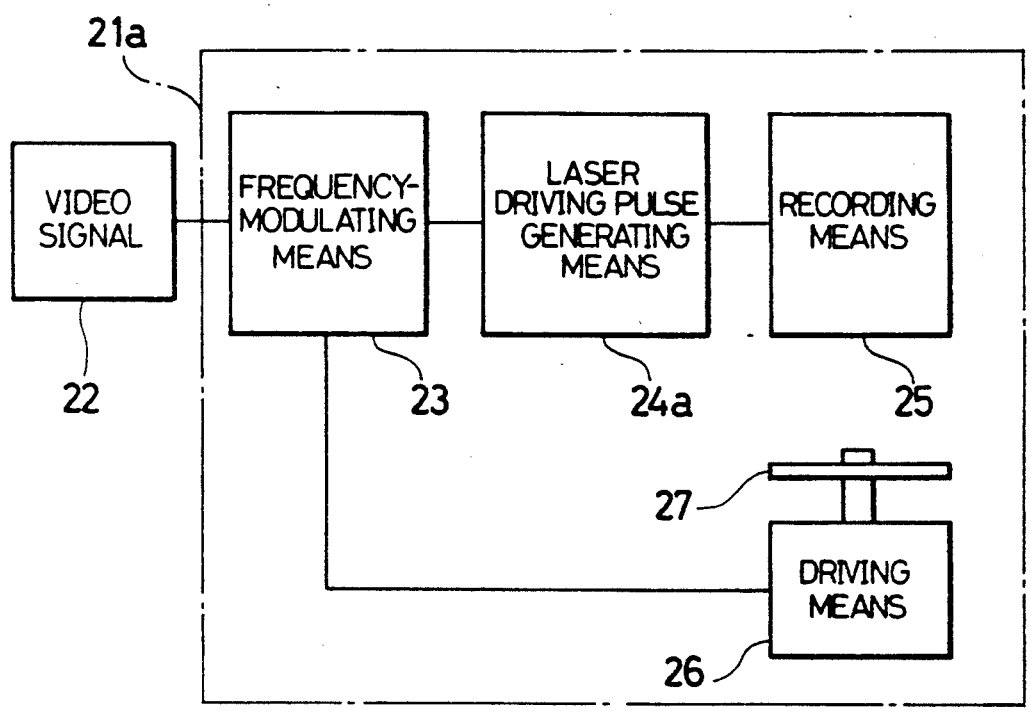
Figure 5:
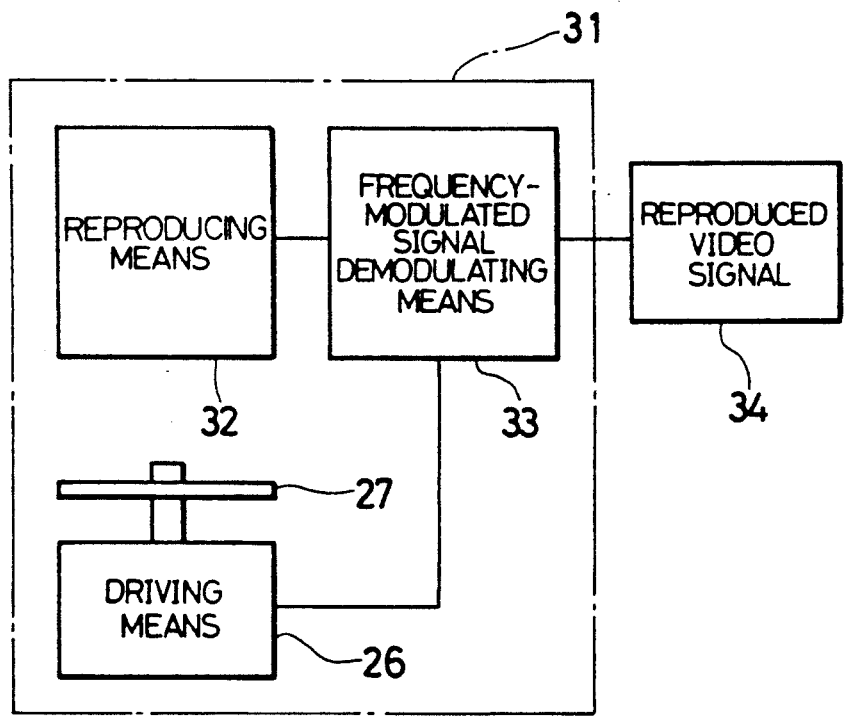

The video signal recording/reproducing device of a first embodiment is employed for recording/reproducing video signals on an optical disk memory. This device comprises a recording section 21a and a reproducing section 31, as shown in FIG. 4 and FIG. 5. The essential parts of the recording section 21a are composed of frequency modulating means 23, laser driving pulse generating means 24a, recording means 25, and driving means 26, as illustrated in FIG. 4. The frequency modulating means 23 releases a frequency-modulated signal derived from a video signal 22 to the laser driving pulse generating means 24a. The laser driving pulse generating means 24a generates a laser driving pulse derived from the frequency-modulated signal which is to be used for recording, modifies the pulse width, or to be more precise the duty factor of the generated laser driving pulse, according to a prescribed rule to be described later and sends it to the recording means 25. The duty factor is the numeric value representing in percentage the ratio of the pulse width to the pulse cycle. The recording means 25 comprises converging means for converging a laser light that was generated in response to the laser driving pulse, onto a predetermined position on an optical disk memory 27. In addition, the driving means 26 drives the optical disk memory 27 in synchronization with the input of video signals 22.

The essential parts of the reproducing section 31 are composed of reproducing means 32, FM demodulating means 33, and the driving means 26, as shown in FIG. 5. The reproducing means 32 projects a laser light onto the optical disk memory 27, detects the information recorded on the optical disk memory 27 and releases and sends a frequency-modulated signal to the FM demodulating means 33. In the demodulating means 33, the frequency-modulated signal that was reproduced as described above, goes through a demodulation process, and a reproduced video signal 34 is released. The driving means 26 is connected to the FM demodulating means 33, and during reproduction drives the optical disk memory 27 in synchronization with the reproduced video signals 34.

The configuration of the recording section 21a and the reproducing section 31 will be described with more detail with reference to FIG. 6 and FIG. 7. In the present embodiment, a magneto-optical disk 27' is employed as optical disk memory 27. The magneto-optical disk 27' uses a recording medium that is composed of an amorphous alloy film made of a rare earth transition metal (for example DyFeCo) in which the axis of easy magnetization is perpendicular to the surface of the film. However, this is not a restrictive example and the present invention may be applied to an optical disk of the phase transition type where recording bits are formed by making use of the inversion of crystallized and amorphous phases.

Figure 6:
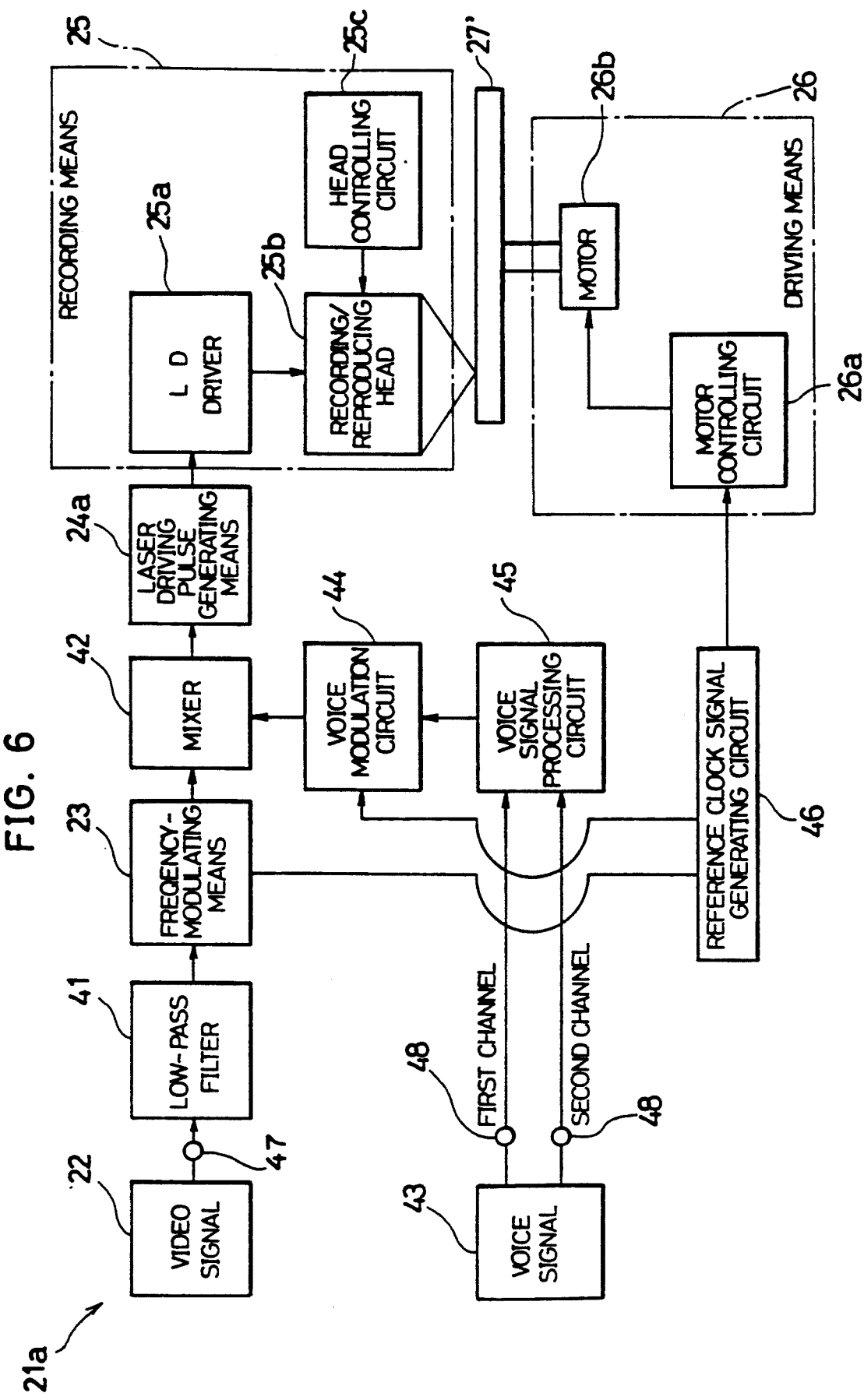

As illustrated in FIG. 6, the video signal 22 is entered into the recording section 21a through an input terminal 47. The video signal from the input terminal 47 is sent to a mixer 42 through a low-pass filter (LPF) 41 and the frequency modulating means 23. A voice signal 43 of a single channel or two channels, is entered though at least one of the input terminals 48. The voice signals from the input terminals 48 are sent to the mixer 42 through a voice signal processing circuit 45 and a voice modulation circuit 44. In the mixer 42, the frequency-modulated video signal that was modulated in the frequency modulating means 23, and the frequency-modulated voice signal that was modulated in the voice modulation circuit 44 are combined to generate a frequency-modulated signal.

The output of the mixer 42 is connected with a recording/reproducing head 25b through the laser driving pulse generating means 24a and the LD driver 25a of the recording means 25. The recording/reproducing head 25b comprises a laser light source composed of a laser diode (hereinafter referred to as LD), the converging means mentioned earlier composed of an objective lens or other member, and a magnetic field applying section. The frequency-modulated signal supplied by the mixer 42, is then recorded on the magneto-optical disk 27' by means of the recording/reproducing head 25b through a light modulation method.

The LD driver 25a is designed such that during recording it is capable of controlling the laser power to an optimum value in accordance with the linear velocity of the magneto-optical disk 27' and the duty factor of the laser driving pulse. In addition, the recording/reproducing head 25b is connected to a head controlling circuit 25c that enables the laser light to be converged correctly on a prescribed position on the magneto-optical disk 27'. The magnetic field applying section may be accommodated separately from the recording/reproducing head 25b.

The driving means 26 is composed of a motor 26b that drives and rotates the magneto-optical disk 27', and a motor controlling circuit 26a that controls the rotational speed of the motor 26b. A reference clock signal generating means 46, which generates a reference clock signal is connected to the frequency modulating means 23, the voice modulation circuit 44, and the motor controlling circuit 26a. The control for the synchronizing signals in the modulating means 23 and the voice modulation circuit 44, as well as the control of the rotational speed of the motor 26b performed by the motor controlling circuit 26a, are executed in accordance with the reference clock signal generated by the reference clock signal generating circuit 46.

Figure 7:
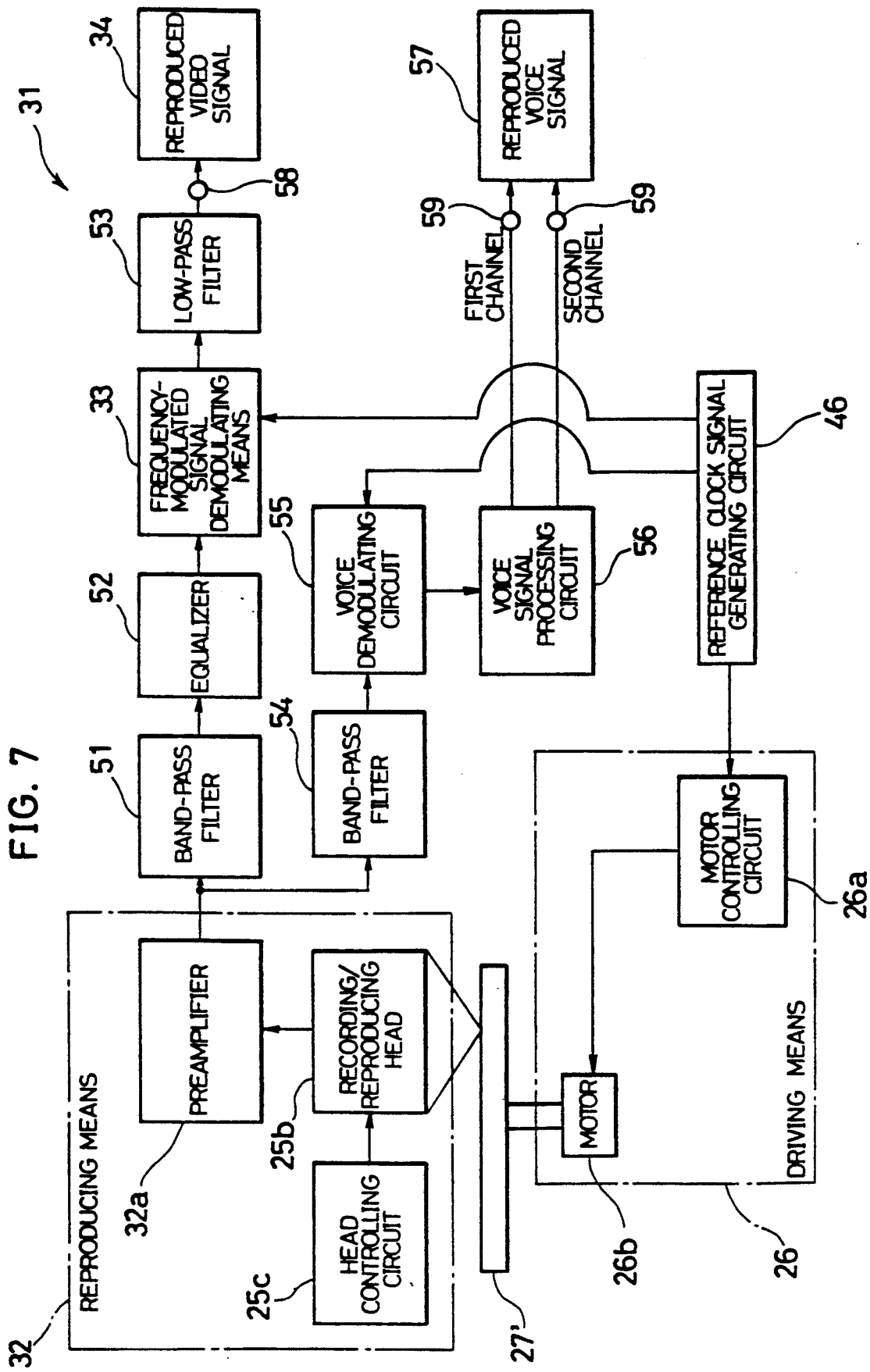

As shown in FIG. 7, the reproducing means 32 of the reproducing section 31 is composed of the recording/reproducing head 25b, the head controlling circuit 25c and a preamplifier 32a. The output of the recording/reproducing head 25b is connected to the preamplifier 32a where the signals that were reproduced are amplified. The output of the preamplifier 32a is connected to a band-pass filter (BPF) 51 and a band-pass filter (BPF) 54. The output of the band-pass filter 54 is connected to a voice signal processing circuit 56 through a voice demodulation circuit 55. The voice signal that passes through the band-pass filter 54, goes through a demodulation process in the voice demodulation circuit 55, is further split into 2 channels in the voice signal processing circuit 56, and is then released as reproduced voice signal 57 through output terminals 59. The output of the band-pass filter 51 is connected to an output terminal 58 through an equalizer 52, the FM demodulating means 33 and a low-pass filter 53. The video signal that went through a demodulation process in the FM demodulating means 33, is released through the output terminal 58 as reproduced video signal 34.

The output of the reference clock signal generating means 46 mentioned earlier is connected to the FM demodulating means 33 and to the voice demodulation circuit 55. The control with the synchronizing signals in the FM demodulating means 33 and in the voice demodulation circuit 55 is executed in accordance with the reference clock signal released by the reference clock signal generating circuit 46.

Figure 1:
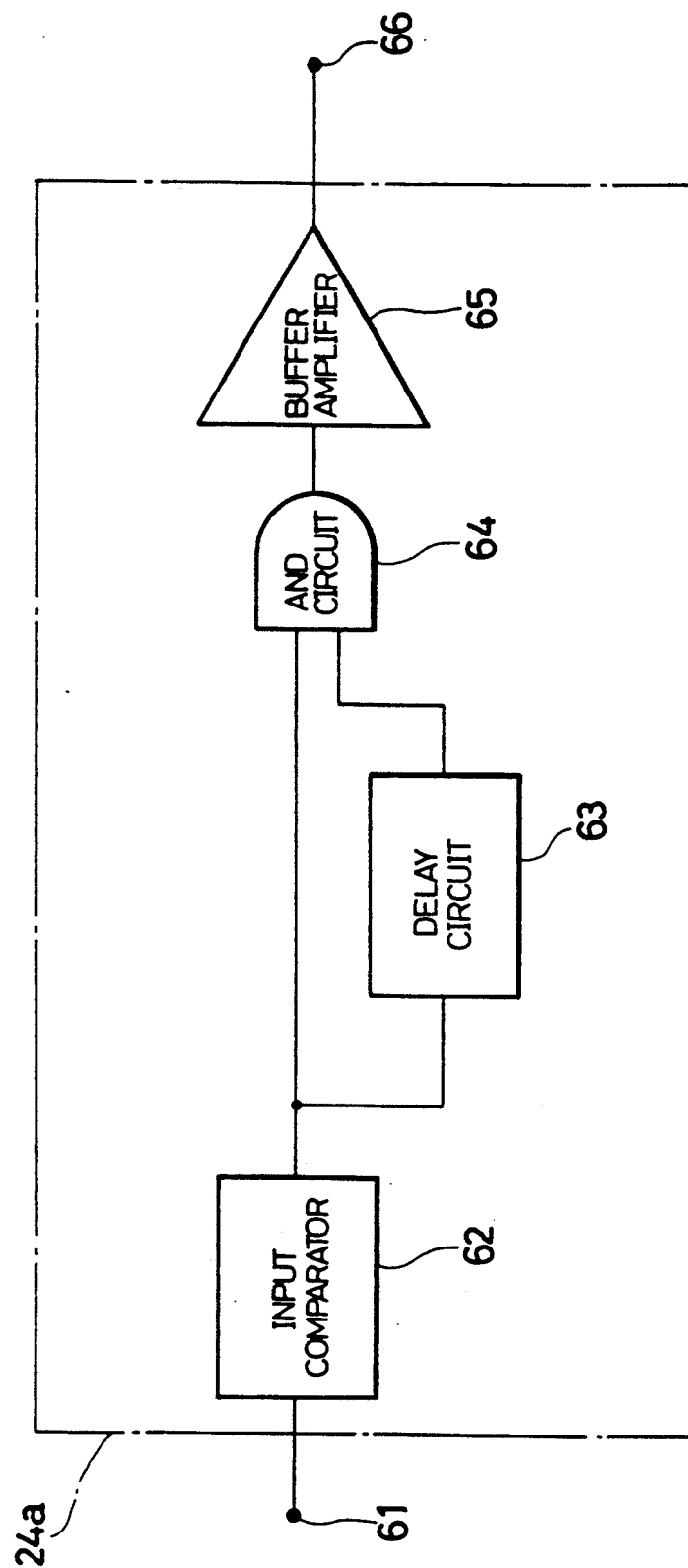

An example of the configuration of the laser driving pulse generating means 24a will be described in detail with reference to FIG. 1.

Provision is made such that the above frequency-modulated signal is fed from the mixer 42, shown in FIG. 6, into an input terminal 61. The output of the input terminal 61 is connected to an input comparator 62 where a pulse that has a duty factor equal to 50% and that corresponds to the above frequency-modulated signal, is generated. (In the conventional art, this pulse that has a 50% duty factor is fed into the recording means as laser driving pulse). The output of the input comparator 62 is connected to a delay circuit 63 and an AND circuit 64. The delay circuit 63 delays the pulse sent from the input comparator 62 by a predetermined time in accordance with the linear velocity of the part of the magneto-optical disk 27' where recording is taking place and generates a delayed pulse that is fed into the AND circuit 64. As a result, the AND circuit 64 releases a pulse whose pulse width is shorter than the pulse width of the pulse generated by the input comparator 62 by an amount equivalent to the time the pulse generated by the input comparator 62 was delayed in the delay circuit 63. The output of the AND circuit 64 is connected to an output terminal 66 through a buffer amplifier 65. A laser driving pulse whose duty factor was reduced from 50% to, for example 30% to 35% in the manner described above, can thus be fed from the output terminal 66 into the LD driver 25a shown in FIG. 6.

The results obtained when in practice recording and reproducing video signals with a video signal recording/reproducing device arranged as described above, will be described hereinbelow.

The signal-to-noise ratio (S/N) is generally used as index for evaluating the signal quality of the reproduced video signal 34. As it is known, the relation between the S/N and a C/N (carrier-to-noise ratio) that was measured with the predetermined carrier frequency of the luminance signal composing the video signal, is determined by the equation (1):

$$S/N = C/N - Q \quad (1)$$

Here, the value Q is a constant determined by the device employed. Therefore, in order to improve the S/N of the reproduced signals, provisions should be made such as to obtain a high C/N.

Figure 2A:
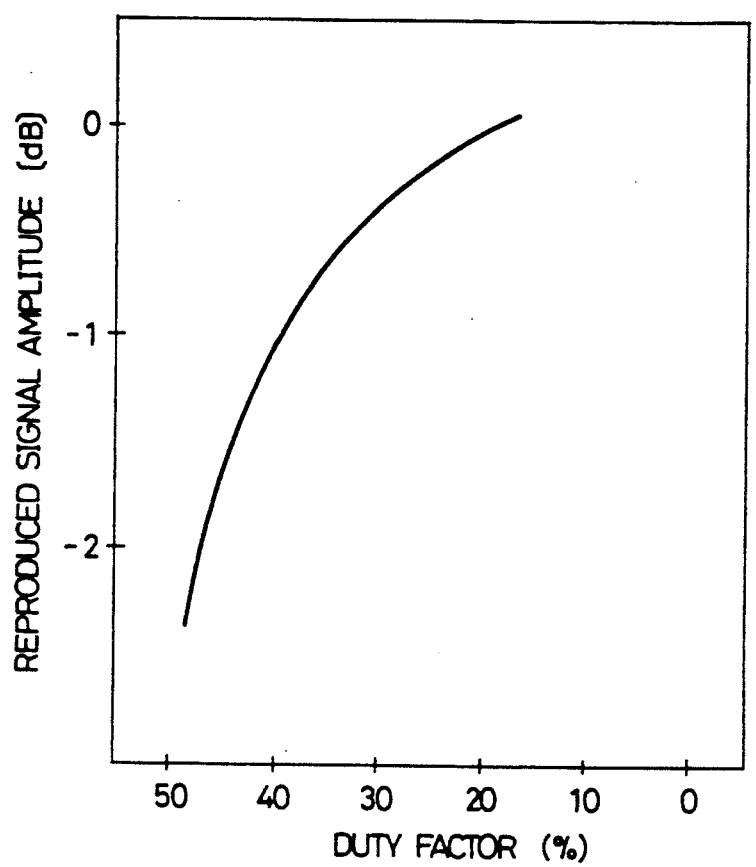
FIG. 2(a) is a graph illustrating the relation between the amplitude of reproduced signals and the duty factor of a laser driving pulse when signals of a single frequency are recorded.
Figure 2B:
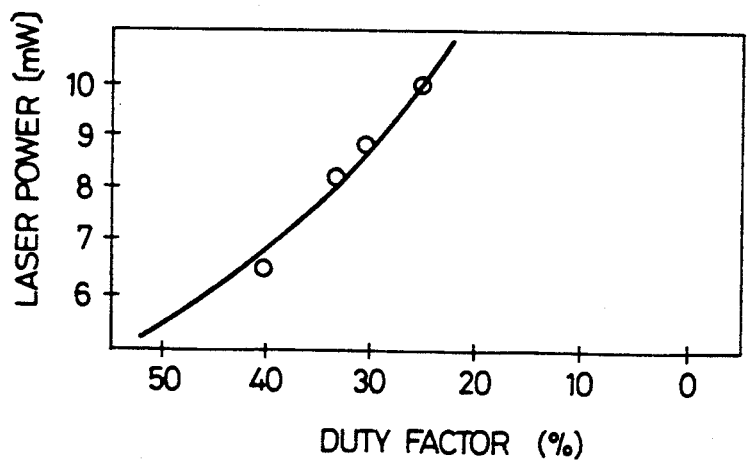
FIG. 2(b) is a graph illustrating the relation between the laser power and the duty factor of the laser driving pulse during recording.
Figure 3:
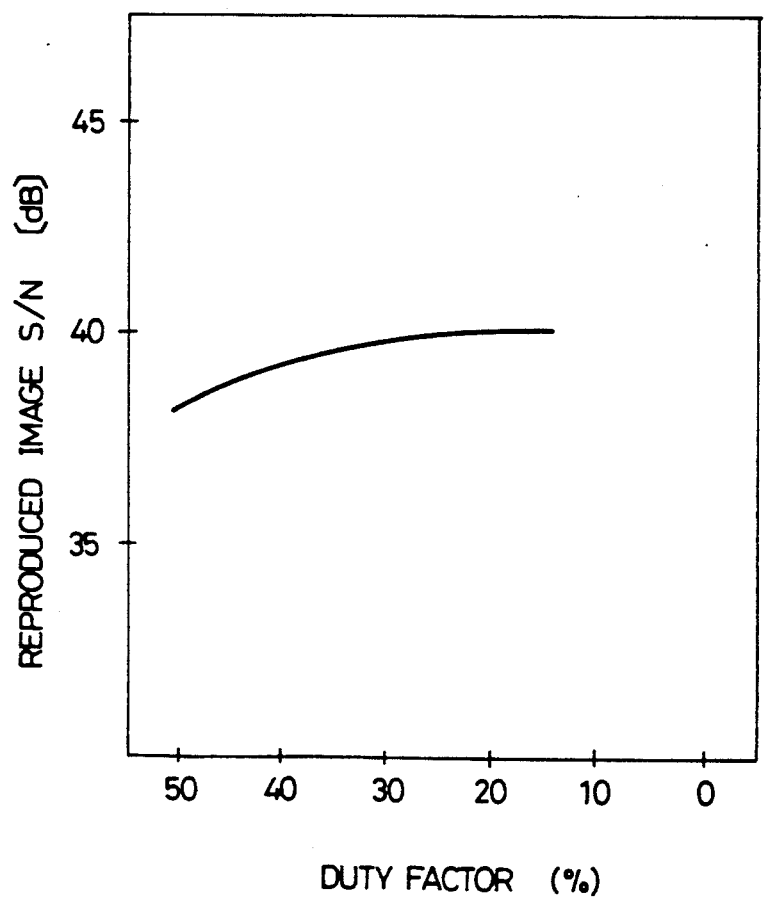

The result of measurement of the C/N when the duty factor was decreased gradually from 50%, is shown in FIG. 2(a). Here, the vertical divisions of FIG. 2(a) form a relative scale using the dB as a unit. Provision was made, as shown in FIG. 2(b), such that the laser power during recording increases as the duty factor decreases. The laser power is set to a value that satisfies the conditions required for forming recording bits permitting an optimum reproducibility for the original signals (i.e. the duty factor of the pulses derived from the reproduced signals is equal to 50%). Hereinafter, this value will be referred to as optimum laser power. As a result, as it is clearly shown by the graph of FIG. 2(a), reducing the duty factor of the laser driving pulse while increasing the laser power during recording, enables the C/N to rise. FIG. 3 shows the results obtained when determining the relation between the duty factor of the laser driving pulse and the S/N of reproduced signals at a predetermined radial position on the magneto-optical disk 27'. As it can be seen in FIG. 3, the S/N rises from 38 dB obtained with the 50% duty factor of the conventional art, to above 40 dB when the duty factor is less than 20%.

When as described above the duty factor of the laser driving pulse is reduced and the laser power is increased during recording, the minor axis of the recording bits that in the conventional art are formed in the shape of an ellipse, which major axis is parallel with the direction of the tracks, is enlarged along a radial direction perpendicular to the track direction, thereby causing the recording bits to be formed in the shape of a circle, and the S/N to rise.

As a result, when a video signal recording/reproducing device arranged as described above is employed, the minimal length of the recording bits permitted to obtain an S/N above 40 dB for the reproduced images, is reduced to 0.73 μm as compared to 0.84 μm in the conventional art. Consequently, the recording capacity of the optical disk memory may be expanded, as will be described later, while maintaining a satisfactory S/N for the reproduced images.

The following will describe the results obtained when comparing the conventional method and the present invention. The FM method proposed in the Journal of the SMPTE article "Signal Processing in the Philips 'VLP' System" by van dan Bussche et al. is the modulation method adopted during recording. The conditions of the recording, described hereinbelow, were set such that the minimal recording bit length with respect to the carrier frequency of the luminance signal is equal to 0.84 μm with a conventional device and equal to 0.73 μm with the video signal recording/reproducing device of the present embodiment. That is, a disk having a diameter equal to 300 mm was employed, the recording frequency (i.e. the carrier frequency of the luminance signal) was set to approximately 9 MHz, more precisely to 8.1 MHz for the black level and to 9.3 MHz for the white level, and the track pitch to 1.6 μm. With the conventional device and with the above conditions, recording/reproducing could be performed for approximately 22 minutes when the CAV (Constant Angular Velocity) method was employed and the rotational speed was equal to 1800 rpm, and for approximately 31 minutes when the CLV (Constant Linear Velocity) method was employed and the linear speed was equal to 15.1 m/s. with the video signal recording/reproducing device of the present embodiment, recording/reproducing could be performed for approximately 26 minutes when the rotational speed was equal to 1800 rpm in the CAV method. When the CLV method was employed, the fact that the minimal length of the recording bits was reduced from 0.84 μm to 0.73 μm enabled reduction of the linear speed from 15.1 m/s, that is the linear speed of the conventional example, to 13.2 m/s. As a result, recording/reproducing could be performed for approximately 40 minutes.

In other words, in the conventional art when recording is performed using the CAV method, the recording area of a 300 mm disk where the S/N for the reproduced images is greater than 40 dB, spreads about a 160 mm diameter circle. However, with the video signal recording/reproducing device of the present embodiment, as the minimal recording bit length is reduced to 0.73 μm, the recording area spreads about a 140 mm diameter circle. This thus permits to increase the recording capacity by a corresponding amount.

As to a 130 mm disk, in the conventional art, recording/reproducing could be performed for approximately only 4.3 minutes with the CLV method. However, with the arrangement of the present embodiment, recording/reproducing could be performed for approximately 5.2 minutes. In addition, when the CLV method is adopted and the linear speed is equal to the linear speed of the conventional example, the recording capacity can be improved by increasing the recording frequency.

A second embodiment of the present invention will be described hereinbelow with reference to FIG. 8 to FIG. 14. For convenience sake, the members having the same function as in the aforementioned embodiment will be designated by the same numeral and their description will be omitted.

Figure 13:
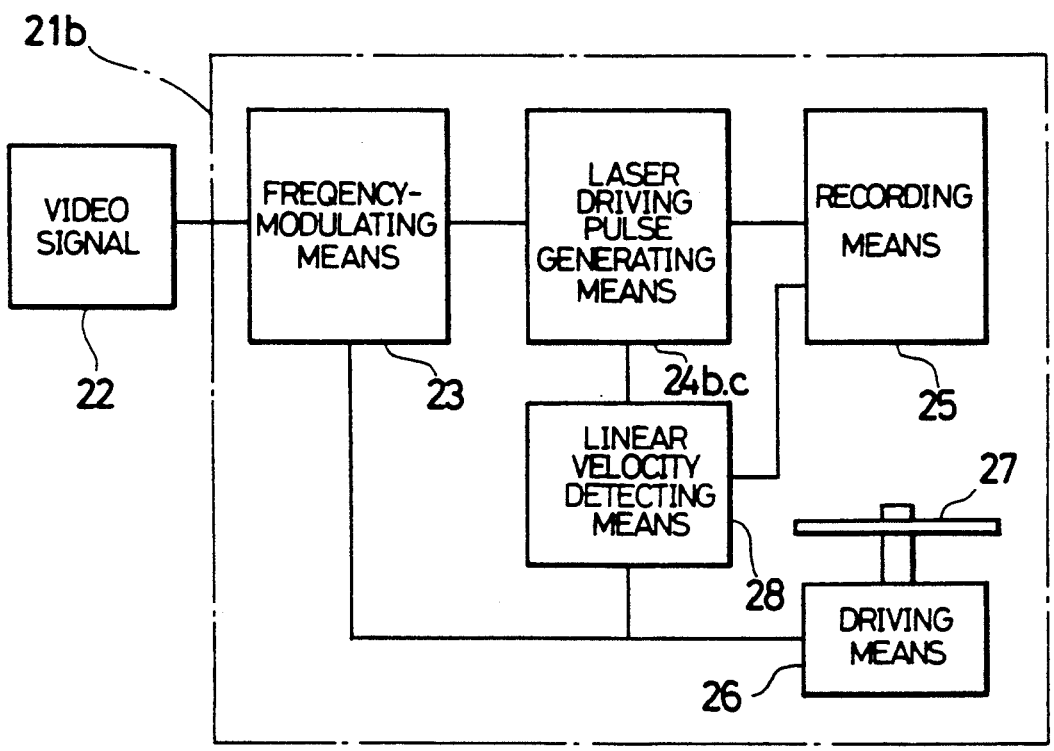

A recording section 21b of the video signal recording/reproducing device of the present embodiment, like the recording section 21a of the previous embodiment, is essentially composed of the frequency modulating means 23, laser driving pulse generating means 24b, the recording means 25 and the driving means 26, as illustrated in FIG. 13. However, unlike in the first embodiment, the laser driving pulse generating means 24b and the driving means 26 are each connected with linear velocity detecting means 28. The linear velocity detecting means 28 detects the linear velocity of the magneto-optical disk 27' based on the radius of the part of the magneto-optical disk 27' being recorded (hereinafter referred to as recording radius). Another difference with the first embodiment lies in that the laser driving pulse generating means 24b adjusts the duty factor of the laser driving pulse and the recording means 25 adjusts the optimum laser power during recording, in accordance with the linear velocity detected by the linear velocity detecting means 28.

Figure 11:
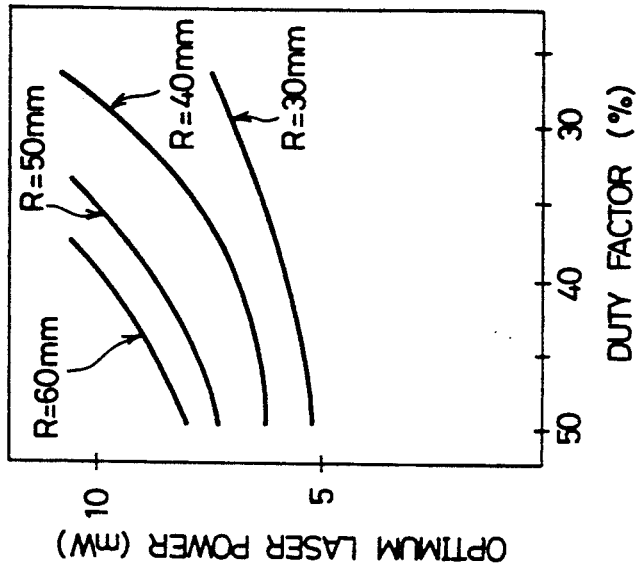

This is because, when the magneto-optical disk 27' is driven to rotate at CAV, the linear velocity of the magneto-optical disk 27' varies depending on the radius. Therefore, the duty factor of the laser driving pulse and the optimum laser power should preferably be changed accordingly during recording. Basically, when the magneto-optical disk 27' is driven by a recording/reproducing device to rotate at CAV, the linear velocity of the magneto-optical disk 27' increases at points closer to the outer periphery of the disk. Therefore, the optimum laser power during recording is increased gradually and thereby the length of the recording bits increased gradually in order to prevent the duty factor of the pulses derived from the reproduced signals to drop below 50% FIG. 11 illustrates the relation between the optimum laser power and the duty factor as a function of the radius R of the magneto-optical disk 27' as a parameter. Namely, when the duty factor is equal to 50%, as in the conventional art, the optimum laser power is increased from approximately 5 mW to approximately 8 mW, in the area within R=30 mm to R=60 mm.

However, as it can be seen in FIG. 11, the smaller the duty factor is and the larger the recording radius is, the more the optimum laser power increases. Recording starts from the inner periphery of the magneto-optical disk 27' and progresses toward the outer periphery. Therefore, if a small duty factor is set for the recording radiuses of the inner periphery, it causes the optimum laser power to grow excessively large in areas of the outer periphery. As a result, the LD is unable to release the desired light power, and its lifespan is substantially shortened. On the other hand, if the duty factor for recording radiuses of the inner periphery is set such as to keep the laser power to a suitable value for recording radiuses of the outer periphery, reproduced signals of a sufficient level cannot be obtained in the inner periphery. In order to solve this problem, a control needs to be executed such that the duty factor that was reduced is set back to 50% as recording progresses toward the outer periphery and such that the optimum laser power does not increase excessively.

Figure 10:
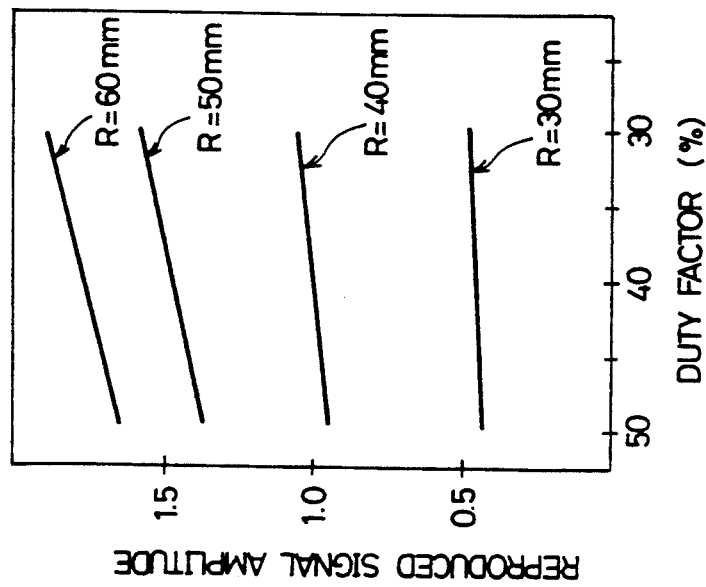

FIG. 10 illustrates the relation between the amplitude of the reproduced signals and the duty factor as a function of the radius R of the magneto-optical disk 27' as a parameter. The vertical divisions in FIG. 10 form a relative scale using absolute numbers. Here, the magneto-optical disk 27' is driven to rotate at CAV. The amplitude of the reproduced signals obtained at each radius in FIG. 10, was determined during a reproduction performed after the optimum laser power was used in recording. Moreover, for each radius, the optimum laser power was increased while the duty factor of the laser driving pulse was reduced during recording, as illustrated in FIG. 11. As it can be seen in FIG. 10, when the radius R on the magneto-optical disk 27' is large, the amplitude of the reproduced signals is large from the beginning. Therefore, reproduced signals having an S/N that is greater than 40 dB can be obtained easily in the outer periphery of the magneto-optical disk 27' even if the duty factor is set back to 50%.

Figure 14:
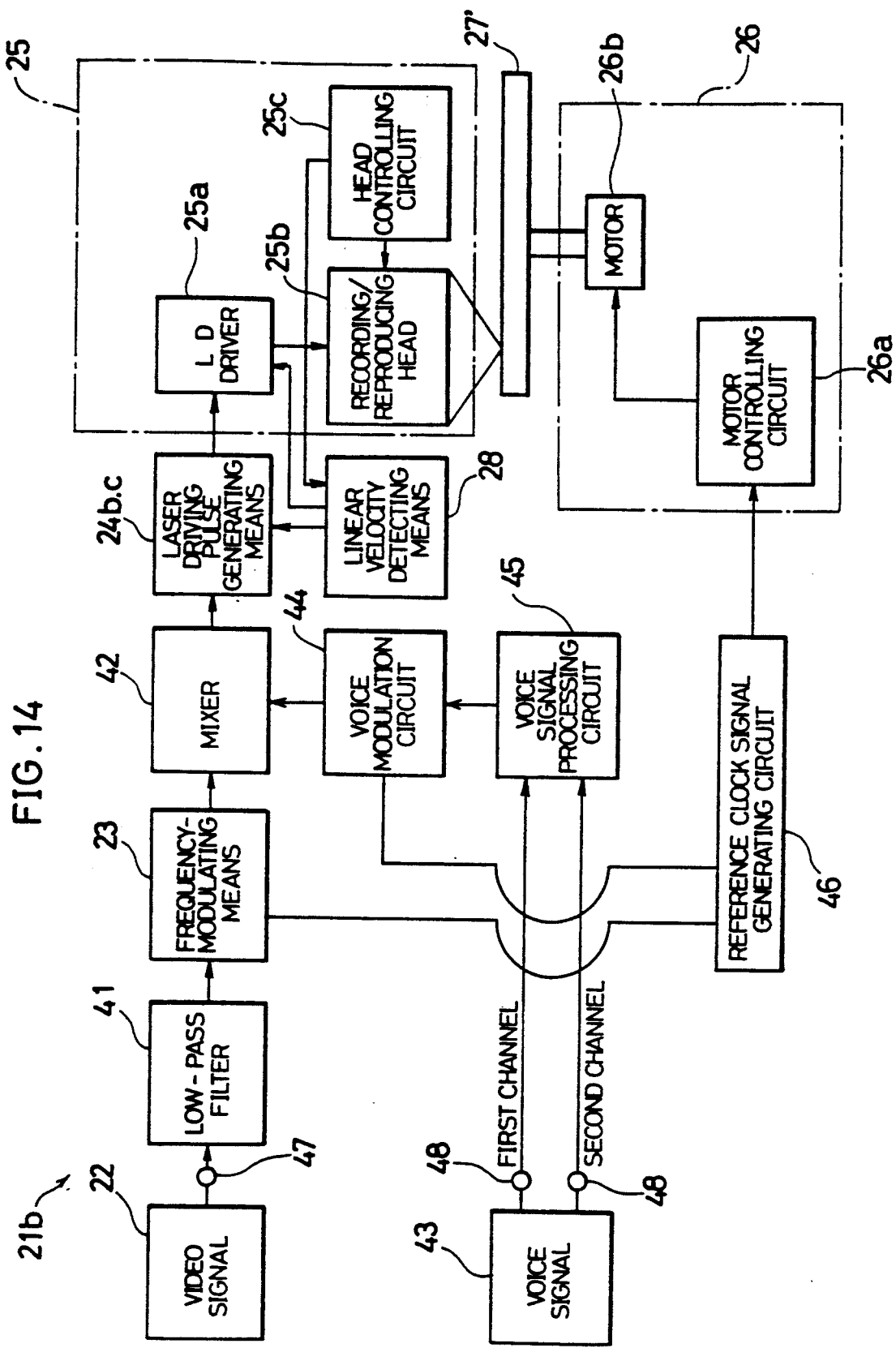

The configuration of the recording section 21b will be described in more detail with reference to FIG. 14. Information concerning the recording position on the magneto-optical disk 27' is fed from the head controlling circuit 25c into the linear velocity detecting means 28 where the linear velocity at the recording radius is detected. (The linear velocity may also be detected directly from the rotation system of the magneto-optical disk 27'). The linear velocity information that was detected through the linear velocity detecting means 28, is fed into the laser driving pulse generating means 24b and into the LD driver 25a. Apart from the above features, the recording section 21b has the same configuration as the recording section 21a shown in FIG. 6.

An example illustrating the detailed configuration of the laser driving pulse generating means 24b will be described with reference to FIG. 8. The laser driving pulse generating means 24b comprises four input terminals 71a to 71d. Provision is made such that the frequency-modulated signal mentioned earlier is fed from the mixer 42 (shown in FIG. 6) into the input terminal 71a. The frequency-modulated signal is fed into an input comparator 72 where it is compared with a slicing level supplied from a D/A (Digital/Analog) converter 73, changed into a binary signal, and converted into a laser driving pulse. To be more precise, a digital data composed of 8 bits and indicating the slicing level of the input comparator 72, is fed from the input terminal 71d into a latch circuit 74 where it is held in accordance with a timing signal supplied from the input terminal 71c. A digital signal derived from the data indicating the slicing level is converted into an analog signal (shown by a straight line II in FIG. 9(a)) by the D/A converter 73, that is fed into the input comparator 72. Then, the frequency-modulated signal (shown by a curved line I in FIG. 9(a)) is compared with the analog signal representing the slicing level in the comparator 72 that releases a laser driving pulse, shown in FIG. 9(b).

Figure 8:
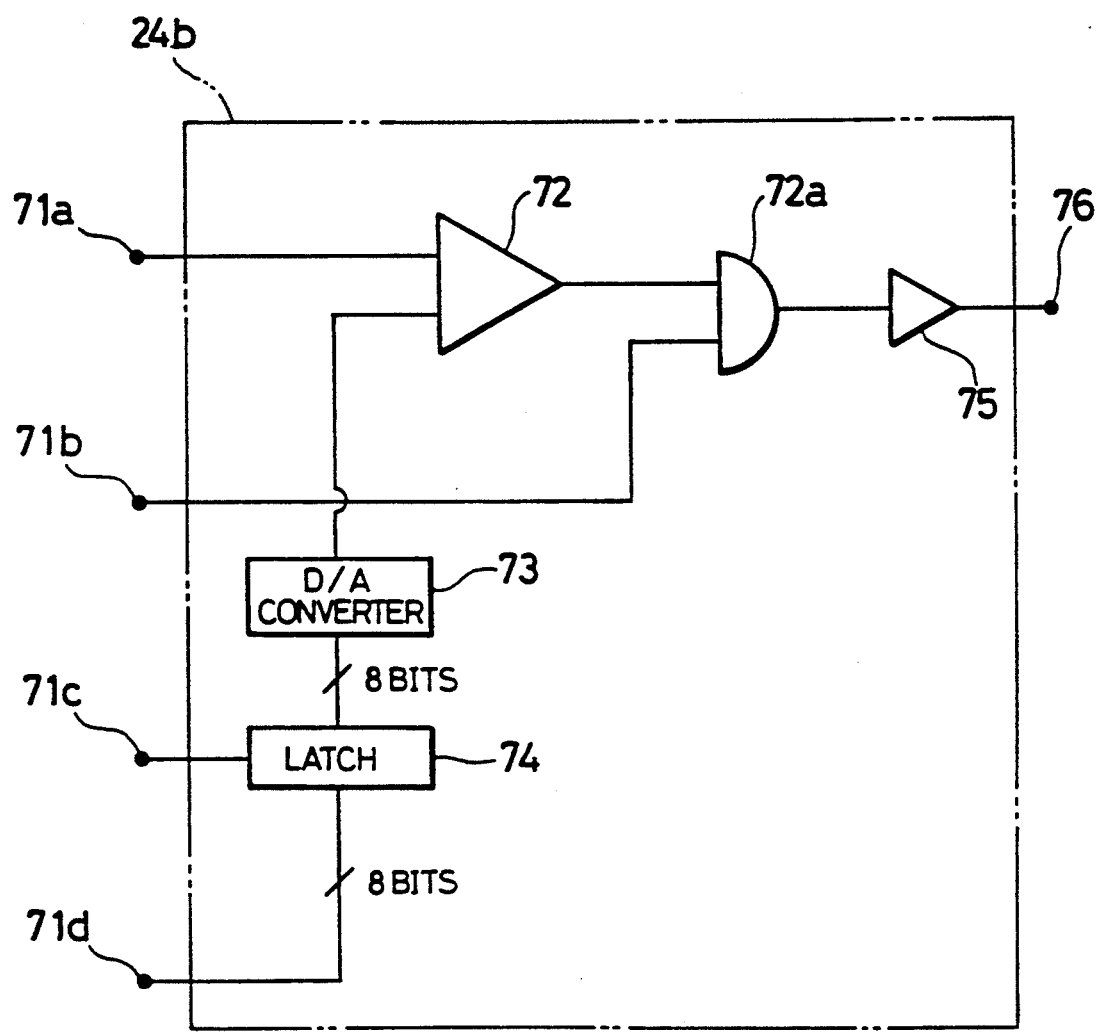
FIG. 8 to FIG. 14 illustrate a second embodiment of the present invention.
Figure 9:
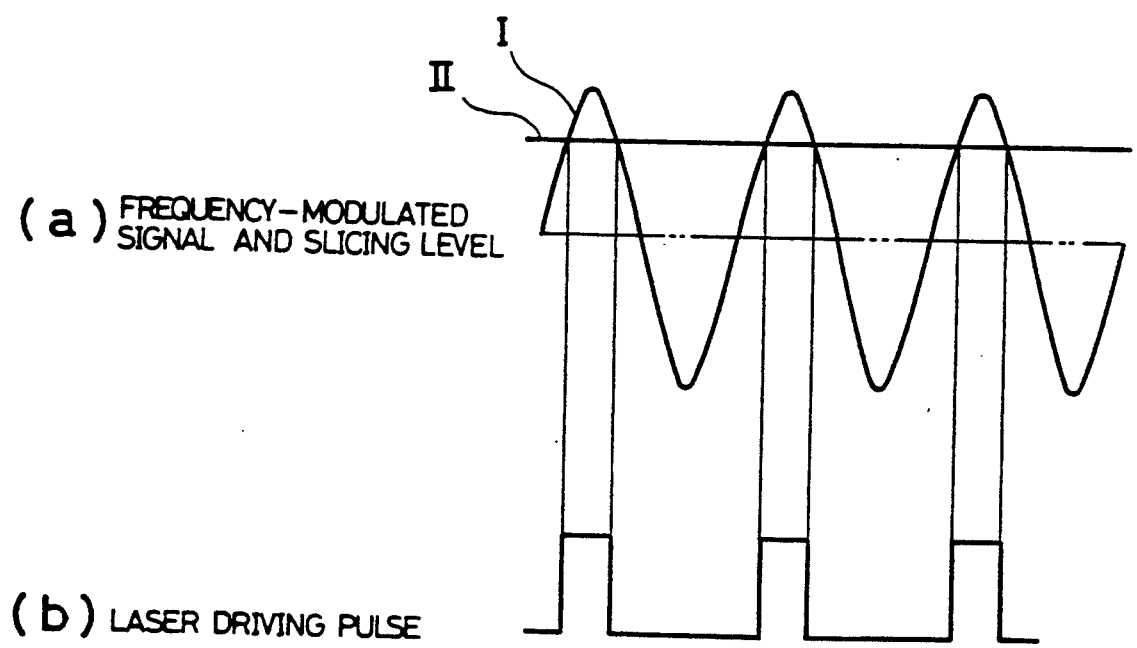

The laser driving pulse released by the input comparator 72 shown in FIG. 8, is fed into one of the input terminals of an inhibiting AND circuit 72a to be described later. As to the other input terminal of the inhibiting AND circuit 72a, provision is made such that an inhibiting signal, to be described later, is fed thereto from the input terminal 71b. When the LD of the recording/reproducing head 25b is to be driven, the inhibiting signal goes high thereby causing the inhibiting AND circuit 72a to release a laser driving pulse. On the other hand, when the inhibiting signal changes to the low level, the output of the inhibiting AND circuit 72a is immobilized in the low level thereby preventing the release of a laser driving pulse. The LD is thus in an un-driven state. The laser driving pulse released by the input comparator 72 in the manner described above, is sent to an output terminal 76 through a buffer amplifier 75. The output terminal 76 is connected with the LD driver 25a shown in FIG. 14.

The input comparator 72, the D/A converter 73 and the latch circuit 74 constitute pulse width adjusting means. This pulse width adjusting means adjusts the pulse width of the laser driving pulse such that the duty factor of the laser driving pulse increases and approaches 50% as the linear velocity of the magneto-optical disk 27' increases.

As clearly shown in FIGS. 9(a) and 9(b), a laser driving pulse having a duty factor smaller than 50% is derived from the frequency-modulated signal and the slicing level. The duty factor can be set to the desired value as the 8-bit data indicating the slicing level varies in response to the linear velocity information released by the linear velocity detecting means 28.

As a result, when the magneto-optical disk 27' is driven to rotate in the CAV method, as the recording-/reproducing head 25b moves toward the outer periphery of the magneto-optical disk 27' and as the linear velocity increases, the slicing level should be modified in response to the output released by the linear velocity detecting means 28, so that the duty factor that was being reduced, is set back to 50%. In addition, the LD driver 25a should control the optimum laser power such that the laser power does not increase excessively when recording takes place in areas located in the outer periphery. Moreover, the control of the optimum laser power should be executed in accordance with the characteristics of the laser power illustrated in FIG. 11 and in response to the results of the detection performed by the linear velocity detecting means 28 and the duty factor of that moment. Accordingly, reproduced signals having a sufficient amplitude can be obtained even in recording areas located in the inner periphery of the magneto-optical disk 27' and in addition, the laser power can be prevented from increasing excessively in the recording areas located in the outer periphery of the magneto-optical disk 27'.

On the other hand, when the magneto-optical disk 27' rotates in CLV, the duty factor of the laser driving pulse released by the laser driving pulse generating means 24b and the optimum laser power of the recording/reproducing head 25b should respectively be set to constant values corresponding to the constant linear velocity detected by the linear velocity detecting means 28. In this case too, the duty factor is set to a constant value that is smaller than the conventional duty factor of 50%. The video signal recording/reproducing device may be equipped with a mode where the quality of the reproduced images is stressed and thereby the linear velocity set a little larger than necessary, and a mode where the recording time is stressed and thereby the linear velocity set a little smaller. In such a video signal recording/reproducing device, the linear velocity is changed in a multistage manner according to the selected mode. In such a case, the duty factor can be adjusted in accordance to the linear velocity. Moreover in this case, the duty factor can be set to the predetermined value by making use of the signal that changes the linear velocity, instead of detecting the linear velocity.

Description will be made hereinbelow of the results obtained when recording and reproducing with a video signal recording/reproducing device having the above arrangement. Here, the recording conditions such as the video signal frequency, the FM method, and other conditions permitting the length of the recording bits to be equal to 0.73 $\mu$m as mentioned earlier, are the same as in the first embodiment. In addition, the magneto-optical disk 27' is driven to rotate in CAV.

Figure 12:
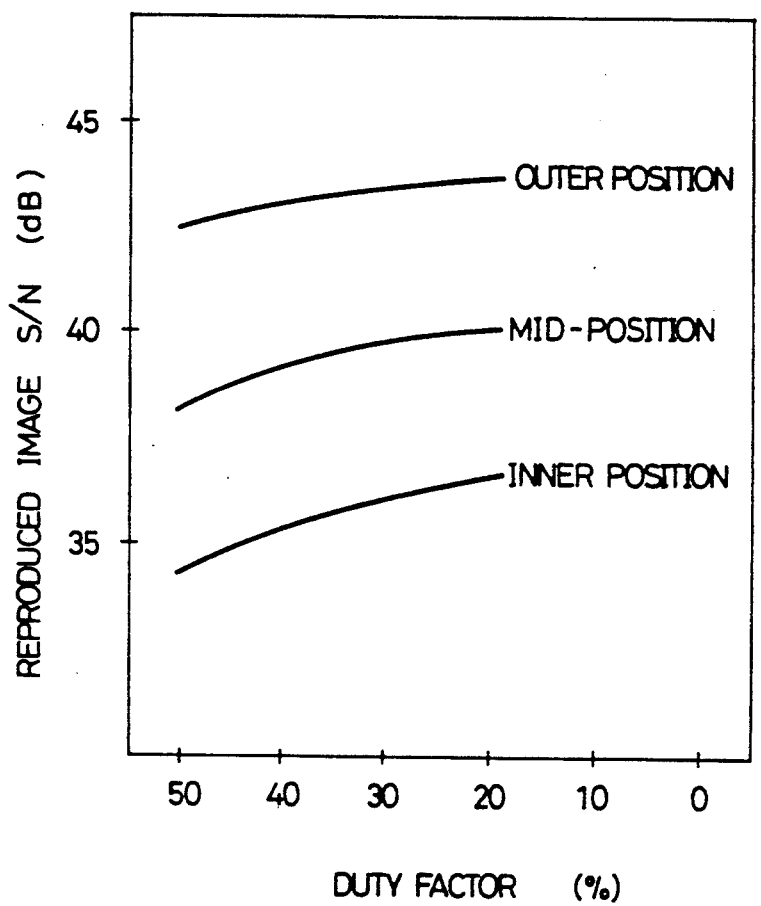

FIG. 12 illustrates the results obtained when the relation between the duty factor of the laser driving pulse and the S/N of the reproduced images, is measured as a function of the recording position on the magneto-optical disk 27' as a parameter. At each recording position, the optimum laser power is gradually increased while the duty factor is reduced as illustrated in FIG. 11. As illustrated in FIG. 12, reducing the duty factor permits improvement of the S/N of the mid-position in a radial direction of the magneto-optical disk 27' from 38 dB in the conventional art to above 40 dB. As a result, recording can be performed in areas where in the conventional art the S/N was less than 40 dB and that could not be employed as recording areas. As described above, the video signal recording/reproducing device of the second embodiment permits increase of the recording capacity of the magneto-optical disk 27' as demonstrated in the first embodiment, while maintaining the optimum laser power at a suitable value in outer areas. In addition, as illustrated by the graph in FIG. 12 corresponding to the outer position, when the recording radius increases, a satisfactory S/N may be obtained even if the duty factor of the laser driving pulse is large. Increasing the duty factor as the recording radius increases thus does not affect the quality of the reproduced images.

Meanwhile, when the CLV method is employed, the reduction of the minimal length of the recording bits permits corresponding reduction of the linear velocity on the disk or increase of the recording frequency. The recording capacity may be thus increased in the same way as described in the first embodiment.

Further, a third embodiment of the present invention will be described hereinbelow with reference to FIG. 15 and FIG. 16.

In the second embodiment, the duty factor of the laser driving pulse was modified as the slicing level was changed in accordance with the linear velocity on the magneto-optical disk 27' when the frequency-modulated signal is converted into a binary signal. In this third embodiment, the duty factor is reduced by generating a pulse, derived from the frequency-modulated signal, having a duty factor equal to 50%, and trimming a fixed amount from the pulse width thereof.

Figure 15:
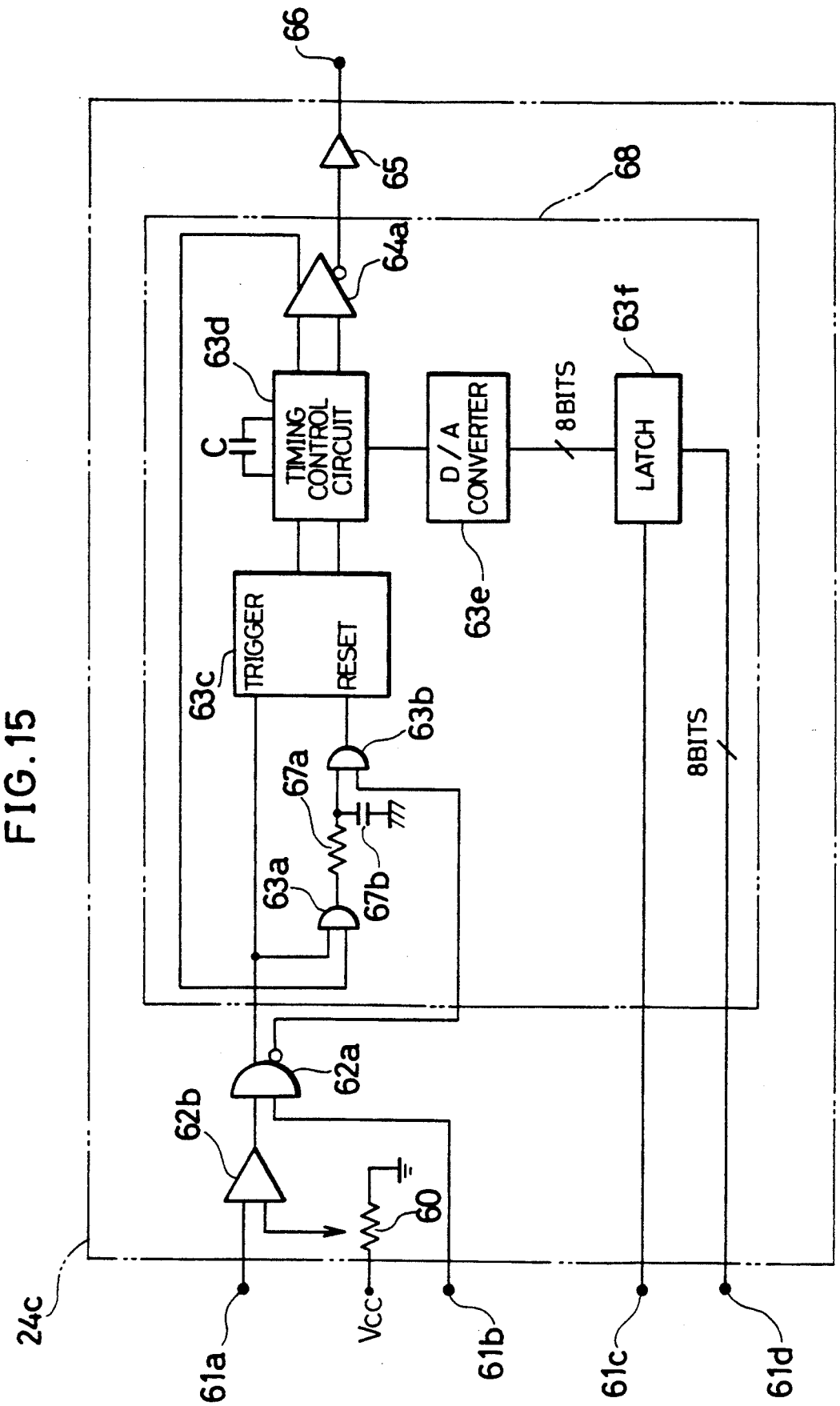
FIG. 15 and FIG. 16 illustrate a third embodiment of the present invention.

The laser driving pulse generating means 24c of the present embodiment comprises 4 input terminals 61a to 61d as illustrated in FIG. 15. Provision is made such that the frequency-modulated signal mentioned earlier is fed from the mixer 42 (shown in FIG. 14) into the input terminal 61a. The frequency-modulated signal is fed into an input comparator 62b through the input terminal 61a. The input comparator 62b compares the frequency-modulated signal and a reference voltage (equal to the mid-value of the peak-to-peak amplitude of the frequency-modulated signal) set by a variable resistor 60, and thereby converts the frequency-modulated signal into a binary signal and then into a pulse having a duty factor equal to 50%.

The pulse released by the input comparator 62b is fed into one of the input terminals of an inhibiting AND circuit 62a. This inhibiting AND circuit 62a is provided with a positive polarity output terminal and a negative polarity output terminal. An inhibiting signal is fed from the input terminal 61b into the other input terminal of the inhibiting AND circuit 62a. When, the inhibiting signal is in the high level, the output of the input comparator 62b stays unchanged and is released from the positive polarity output terminal of the inhibiting AND circuit 62a, as illustrated by (a) in FIG. 16. In addition a signal, as shown by (b) in FIG. 16, corresponding to the inverted output of the input comparator 62b is released from the negative polarity output terminal of the inhibiting AND circuit 62a. On the other hand, when the inhibiting signal is of a low level the positive polarity output and negative polarity output from the inhibiting AND circuit are both immobilized in the low level and high level respectively. The inhibiting signal is in the high level when the LD of the recording/reproducing head 25b is driven.

The positive polarity output terminal of the inhibiting AND circuit 62a is connected to a trigger input terminal of a trigger and reset circuit 63c. When the LD is driven (i.e. when the inhibiting signal is in the high level) the above pulse whose duty factor is equal to 50% stays unchanged and is fed into the trigger input terminal. The trigger and reset circuit 63c releases an output of a fixed level that rises as the pulse that was entered into the trigger input terminal rises, and that is fed into a timing control circuit 63d. The timing control circuit 63d. which is externally accommodated with a capacitor C generates a sawtooth wave, such as a wave I shown by (c) in FIG. 16. The sawtooth wave returns to the above fixed level when a reset pulse (shown by (d) in FIG. 16) is sent from the trigger and reset circuit 63c to the timing control circuit 63d.

The reset pulse is generated by the trigger and reset circuit 63c according to the following arrangement. The positive polarity output terminal of an output circuit 64a is connected to one of the input terminals of an AND circuit 63a. The other input terminal of the AND circuit 63a, is connected to the positive polarity output terminal of the inhibiting AND circuit 62a. The output terminal of the AND circuit 63a is connected to one of the input terminals of the AND circuit 63b through an integration circuit composed of a resistor 67a and a grounded capacitor 67b. The other input terminal of the AND circuit 63b is connected to the negative polarity output terminal of the inhibiting AND circuit 62a. Further, the output terminal of the AND circuit 63b is connected to the reset input terminal of the trigger and reset circuit 63c. Provision is made such that the negative polarity output terminal of the output circuit 64a releases a laser driving pulse to be described later (shown by (f) in FIG. 16), and the positive polarity output terminal of the output circuit 64a releases a pulse corresponding to the inverted laser driving pulse (shown by (e) in FIG. 16).

Figure 16:
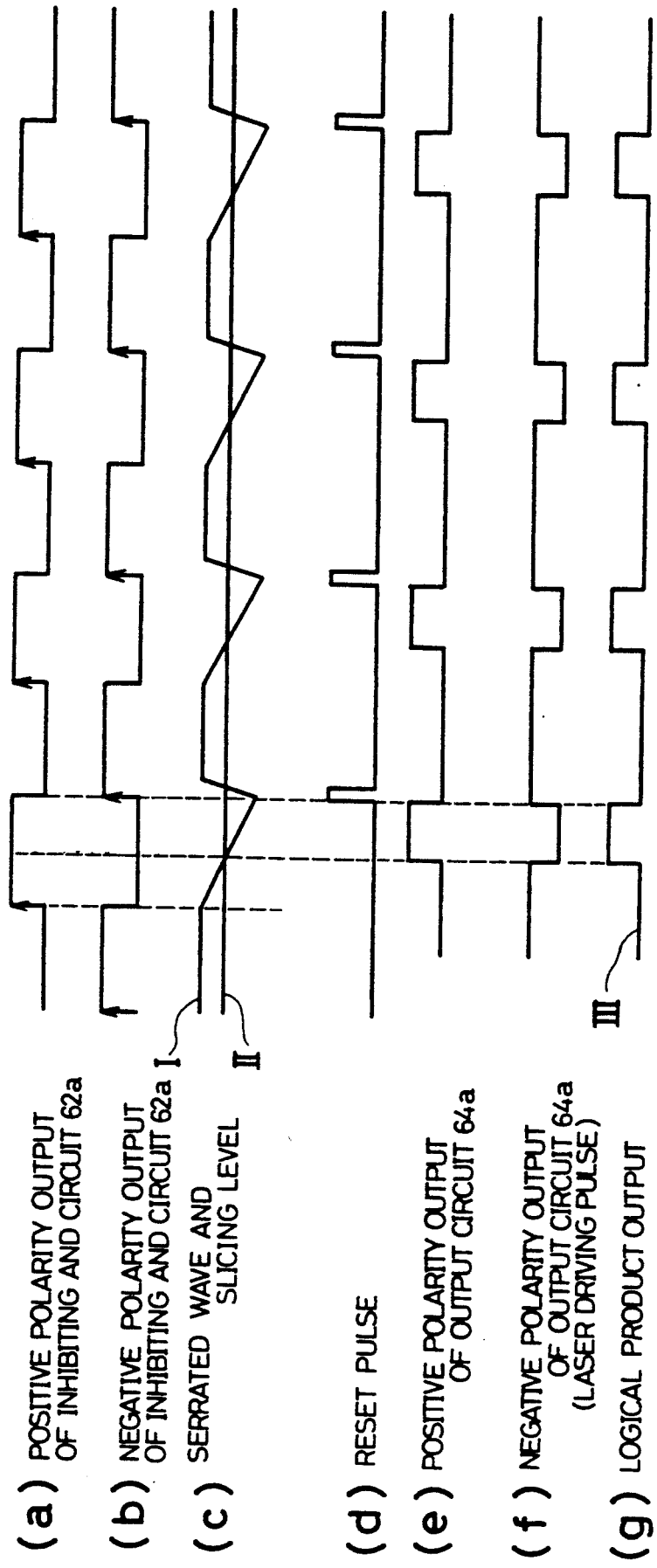

When the positive polarity output released by the inhibiting AND circuit 62a (shown by (a) in FIG. 16), and the positive polarity output released by the output circuit 64a (shown by (f) in FIG. 16) are in the high level, the AND circuit 63a releases the logical product thereof (output III shown by (g) in FIG. 16). One of the inputs of the AND circuit 63b changes to the high level in response to the output released by the AND circuit 63a that was delayed by a time constant determined by the resistor 67a and the capacitor 67b. When the negative polarity output of the inhibiting AND circuit 62a changes to the high level, the AND circuit 63b releases a high level signal to the trigger and reset circuit 63c. In such a manner, the trigger and reset circuit 63c releases and sends to the timing control circuit 63d, a reset pulse for restoring the sawtooth wave to the fixed level.

The slicing level of the timing control circuit 63d is set according to digital data composed of for example 8 bits. The digital data is fed from the above input terminal 61d into a latch circuit 63f where it is held in accordance with a timing signal supplied from the input terminal 61c. The digital signal indicating the slicing level is converted into an analog signal (shown by (c) as a straight line II in FIG. 16) in a D/A converter 63e and is fed thereafter into the timing control circuit 63d. The sawtooth wave mentioned above and the slicing level are then compared in the timing control circuit 63d. When the decaying sawtooth wave crosses the slicing level, the timing control circuit 63d releases a signal that drops from the high level to the low level, as shown by (f) in FIG. 16. When a reset pulse is fed into the timing control circuit 63d, the timing control circuit 63d releases a signal that rises from the low level to the high level. The output circuit 64a thus releases as laser driving pulse a signal inverted with respect to the output of the timing control circuit 63d, as shown by (f) in FIG. 16. The laser driving pulse is fed from the negative polarity output terminal of the output circuit 64a through a buffer amplifier 65a into an output terminal 66a. The output terminal 66a is connected to the LD driver 25a shown in FIG. 14.

The AND circuits 63a and 63b, the integration circuit composed of the resistor 67a and the capacitor 67b, the trigger and reset circuit 63c, the timing control circuit 63d, the D/A converter 63e, the latch circuit 63f and the output circuit 64a form pulse adjusting means 68.

As (e) in FIG. 16 clearly indicates, the width of the laser driving pulse is smaller than the width of the pulse generated in the input comparator 62b and whose duty factor is equal to 50%. As in the second embodiment, in order to set the width of the pulse to a desired value, the slicing level II (shown by (c) in FIG. 16) should be changed by modifying the 8-bit digital data in accordance with the linear velocity on the magneto-optical disk 27' detected through the linear velocity detecting means 28.

As described above, for recording radiuses where the linear velocity is small (i.e. for recording radiuses where the amplitude of the reproduced signals is not sufficient), the duty factor of the laser driving pulse should be reduced and the laser power increased. Such an arrangement permits improvement of the S/N of the reproduced signals. Meanwhile, for recording radiuses where the linear velocity is large (i.e. where both the optimum laser power and the amplitude of the reproduced signals are large), the laser power may be restrained from being increased excessively by setting the duty factor larger than when the linear velocity is small. Accordingly, a video signal recording/reproducing device in accordance with the present invention is capable of executing fine recording/reproducing independently of variations in the linear velocity even in cases where the linear velocity varies depending on the relative position of the optical disk memory and the laser light source, such as for example when the optical disk memory is controlled to rotate in CAV.

Further a fourth embodiment of the present invention will be described hereinbelow with respect to FIG. 17 and FIG. 18. For convenience sake, the members having the same function as the members shown in the figures of the aforementioned embodiments will be designated by the same numeral and their description will be omitted.

The present embodiment is characterized in that the duty factor of the laser driving pulse is adjusted in accordance with the linear velocity or the recording radius, while the laser power during recording is maintained constant.

Figure 18:
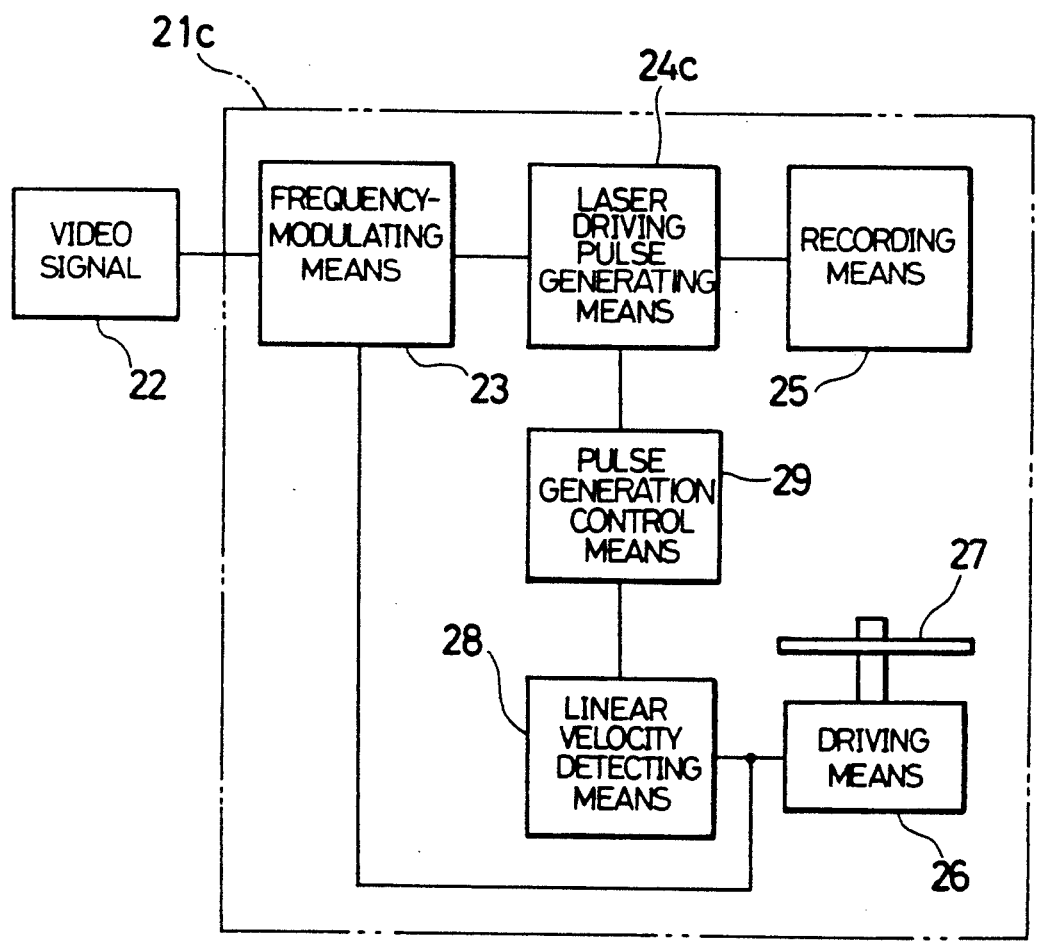

The essential parts of a recording section 21c included in the video signal recording/reproducing device of the present embodiment consist of, as illustrated in FIG. 18 and the frequency modulating means 23, laser driving pulse generating means 24c, recording means 25, driving means 26 and linear velocity detecting means 28. Here, pulse generation control means 29 and the linear velocity detecting means 28 are connected in series between the laser driving pulse generating means 24c and the driving means 26. When the laser power during recording is controlled to a constant value by the recording means 25, the pulse generation control means 29 controls the laser driving pulse generating means 24c in accordance with the linear velocity information supplied by the linear velocity detecting means 28, and sets the duty factor of the laser driving pulse to an optimum value. The configuration of the recording means 25, the configuration of the laser driving pulse generating means 24c and the method for generating the laser driving pulse are the same as in the third embodiment.

Figure 17:
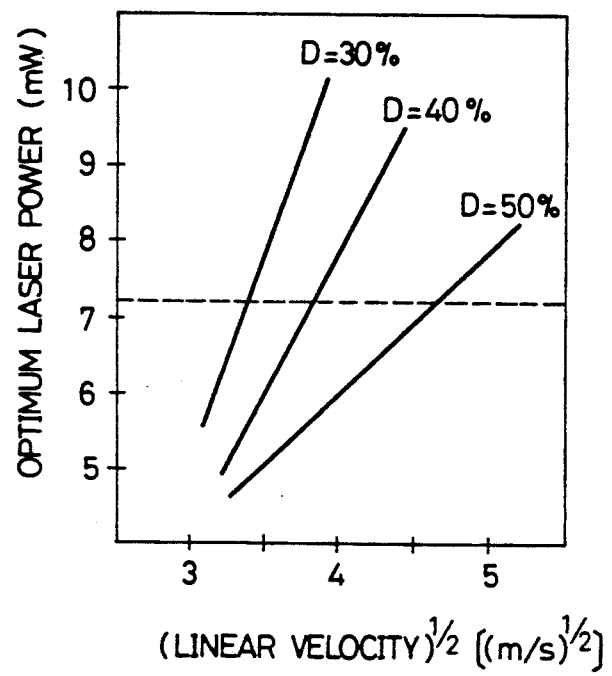
FIG. 17 and FIG. 18 illustrate a fourth embodiment of the present invention.

FIG. 17 illustrates the relation between the optimum laser power during recording and the ($\frac{1}{2}$)th power (i.e, the square root) of the linear velocity on the magneto-optical disk 27' as a function of the duty factor as a parameter. The linear velocity increases as recording on the magneto-optical disk 27' proceeds from the inner periphery toward the outer periphery, causing the optimum laser power to rise, as it has been described earlier. Moreover, as described earlier too, reducing the duty factor of the laser driving pulse while increasing the optimum laser power during recording, causes the shape of the recording bits to change from an ellipse extending in the track direction, to a circle, and thereby permits improvement of the C/N during the reproduction.

In the present embodiment, in order to simplify the control of the laser power, provision is made such that, when the recording means 25 controls the laser power to a constant value such as for example shown by the broken line in FIG. 17, the pulse generation control means 29 controls the duty factor of the laser driving pulse during recording to an optimum value in accordance with the linear velocity on the magneto-optical disk 27' detected by the linear velocity detecting means 28, and with the constant value of the laser power. As a result, the duty factor is controlled by the pulse generation control means 29 such as to increase gradually and to approach 50% as recording on the magneto-optical disk 27' proceeds from the inner periphery toward the outer periphery. In other words, the pulse generation control means 29 controls the laser driving pulse generating means 24c such that on the outer portion of the magneto-optical disk 27' where recording is taking place, the less the pulse width of the laser driving pulse is trimmed as compared to the pulse width of the pulse generated by the input comparator 62b and derived from the frequency-modulated signal.

In such a manner, the laser power can be maintained at a constant value during recording irrespectively of the linear velocity of the magneto-optical disk 27' or of the recording radius, and the laser power still corresponds to the optimum laser power for each recording radius. The system that controls the laser power is thus simplified and the recording capacity may be increased as described in the first embodiment. Here, the initial value of the amount trimmed on the pulse width of the laser driving pulse and the initial value to which the optimum laser power is maintained, are set such that the length of the recording bits located on the innermost recording radius of the magneto-optical disk 27' is equal to 0.73 μm.

In the above fourth embodiment, the duty factor of the laser driving pulse may be adjusted by means of the laser driving pulse generating means 24b of the second embodiment shown in FIG. 8.

In addition to recording/reproducing devices for magneto-optical disks, the configuration of the video signal recording/reproducing device of the present invention may be adapted to recording/reproducing devices for Write-Once type optical disks. It may also be adopted when cutting the original disk of Read-Only type optical disks with an Ar laser or the like.

As described above a video signal recording/reproducing device in accordance with the present invention enables reduction of the minimal length of the recording bits, which permits maintaining of a satisfactory S/N for reproduced signals, thereby enabling areas located inner portion of the optical disk memory to be recorded when the CAV method is employed, and the speed at which the recording medium is driven to be lowered when the CLV method is adopted. Accordingly, the recording capacity may be increased when either the CAV method or the CLV method is adopted.

Moreover, the laser power is always fixed to a constant value, with no need for changing the laser power during recording according to the linear velocity or the recording radius of the part on the optical disk memory where recording is taking place, and in addition the duty factor of the laser driving pulse is adjusted so that the laser power corresponds to the optimum laser power for each radius. This arrangement thus permits simplification of the laser driving system.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A video signal recording/reproducing device comprising:
    a laser light source, for projecting a laser light on an optical disk memory, to record/reproduce video signals;
    frequency modulating means for generating frequency-modulated signals representative of said video signals for recording on said optical disk memory;
    laser driving pulse generating means, coupled to said frequency modulating means, for generating laser driving pulses derived from said frequency-modulated signals, a duty factor of said laser driving pulses being modified in accordance with a linear velocity signal indicative of a linear velocity of a part of said optical disk memory where recording is performed;
    recording means, coupled to said laser light source, for recording said frequency-modulated signals by converging said laser light, emitted from said laser light source in accordance with said laser driving pulses, on said optical disk memory;
    driving means for driving said optical disk memory during recording/reproducing;
    linear velocity detecting means, coupled to said recording means and said laser driving pulse generating means, for detecting said linear velocity to generate said linear velocity signal;

reproduction means for reproducing said frequency-modulated signals recorded on said optical disk memory by said recording means to output a reproduction pulse signal; and FM demodulating means, coupled to said reproduction means, for demodulating said reproduction pulse signal, said recording means including laser light source driving means, coupled to said laser driving pulse generating means and said laser light source, for driving said laser light source in response to said laser driving pulses and for controlling output power of said laser light source to be an optimum value during recording according to said linear velocity signal and the duty factor of said laser driving pulses, recording head means equipped with converging means for converging said laser light emitted by said laser light source onto said optical disk memory and a magnetic field applying section for emitting an auxiliary magnetic field, and head control means, coupled to said recording head means, for controlling the converging position of said laser light, said laser driving pulse generating means and said laser light source driving means respectively controlling the duty factor of said laser driving pulses and the output power of said laser light source to be optimum values so that said reproduction pulse signal has a duty factor substantially equal to 50%, said laser driving pulse generating means including comparator means, coupled to said frequency modulating means, for comparing said frequency-modulated signals and a level corresponding to a mid-value of the peak-to-peak amplitude of said frequency-modulated signals to convert said frequency-modulated signals into binary signals of pulses having a duty factor equal to 50%, delay means, coupled to said comparator means, for delaying said pulses generated by said comparator means by a predetermined time to generate delayed pulses in accordance with said linear velocity of the part of said optical disk memory where recording is being performed, and AND circuit, coupled to said comparator means and said delay means, for performing a logical AND function of said pulses generated by said comparator means and said delayed pulses, to generate an AND output signal, and buffer amplifier means, coupled to said AND circuit, for amplifying and outputting said AND output signal as said laser driving pulses.

2. A video signal recording/reproducing device comprising:

a laser light source, for projecting a laser light on an optical disk memory, to record/reproduce video signals;

frequency modulating means for generating frequency modulated signals representative of said video signals for recording on said optical disk memory;

laser driving pulse generating means, coupled to said frequency modulating means, for generating laser driving pulses derived from said frequency-modulated signals, a duty factor of said laser driving pulses being modified in accordance with a linear velocity signal indicative of a linear velocity of a part of said optical disk memory where recording is performed;

recording means, coupled to said laser light source, for recording said frequency-modulated signals by converging said laser light, emitted from said laser light source in accordance with said laser driving pulses, on said optical disk memory;

driving means for driving said optical disk memory during recording/reproducing;

linear velocity detecting means, coupled to said recording means and said laser driving pulse generating means, for detecting said linear velocity to generate said linear velocity signal;

reproduction means for reproducing said frequency-modulated signals recorded on said optical disk memory by said recording means to output a reproduction pulse signal; and FM demodulating means, coupled to said reproduction means, for demodulating said reproduction pulse signal, said recording means including laser light source driving means, coupled to said laser driving pulse generating means and said laser light source, for driving said laser light source in response to said laser driving pulses and for controlling output power of said laser light source to be an optimum value during recording according to said linear velocity signal and the duty factor of said laser driving pulses, recording head means equipped with converging means for converging said laser light emitted by said laser light source onto said optical disk memory and a magnetic field applying section for emitting an auxiliary magnetic field, and head control means, coupled to said recording head means, for controlling the converging position of said laser light, said laser driving pulse generating means and said laser light source driving means respectively controlling the duty factor of said laser driving pulses and the output power of said laser light source to be optimum values so that said reproduction pulse signal has a duty factor substantially equal to 50%, said laser driving pulse generating means including pulse width adjusting means for increasing the duty factor of said laser driving pulses so that the duty factor approaches 50%, as said linear velocity of said optical disk memory detected by said linear velocity detecting means increases.

3. The video signal recording/reproducing device in accordance with claim 2, wherein said laser driving pulse generating means further comprises:

comparator means, coupled to said frequency modulating means, for comparing said frequency-modulated signals and a level corresponding to a mid-value of the peak-to-peak amplitude of said frequency-modulated signals to convert said frequency-modulated signals into binary signals of pulses having a duty factor equal to 50%;

delay means, coupled to said comparator means, for delaying said pulses generated by said comparator means by a predetermined time to generate delayed pulses in accordance with said linear velocity of the part of said optical disk memory where recording is being performed;

an AND circuit, coupled to said comparator means and said delay means, for performing a logical AND function of said pulses generated by said comparator means and said delayed pulses, to generate an AND output signal; and buffer amplifier means, coupled to said AND circuit, for amplifying and outputting said AND output signal as said laser driving pulses.

4. The video signal recording/reproducing device in accordance with claim 2, wherein said laser driving pulse generating means comprises:

comparator means, coupled to said frequency modulating means, for comparing said frequency-modulated signals with a slicing level that decreases as said linear velocity of said optical disk memory increases, to generate comparator pulses, in accordance with said frequency-modulated signals, of a duty factor which increases and approaches 50% as said linear velocity of said optical disk memory increases;

latch means for holding an 8-bit digital data, output from said linear velocity detecting means, which is indicative of the slicing level of said comparator means, and for outputting a latch signal in accordance with a predetermined timing signal;

D/A converter means, coupled to said latch means, for converting said latch signal into an analog signal and for outputting said analog signal as said slicing level to said comparator means;

inhibiting AND means, coupled to said comparator means and responsive to an externally generated inhibiting signal which is a high level when said laser light source is driven by said laser light source driving means and which is a low level when said laser light source is not driven by said laser light source driving means, for outputting said comparator pulses when said inhibiting signal is of said high level; and buffer amplifier means, coupled to said inhibiting AND means, for amplifying and outputting said comparator pulses as said laser driving pulses.

5. The video signal recording/reproducing device in accordance with claim 4, wherein said pulse width adjusting means comprises said comparator means, said D/A converter means and said latch means.

6. The video signal recording/reproducing device in accordance with claim 2, wherein said laser driving pulse generating means comprises:

comparator means, coupled to said frequency modulating means, for comparing said frequency-modulated signals with a level corresponding to a mid-value of the peak-to-peak amplitude of said frequency-modulated signals to convert said frequency-modulated signals into binary signals output as comparator pulses having a duty factor equal to 50%;

inhibiting AND means, coupled to said comparator means and an externally generated inhibiting signal which is a high level when said laser light source is driven by said laser light source driving means and which is a low level when said laser light source is not driven by said laser light source driving means, for outputting said comparator pulses from a positive polarity output terminal and for inverting and outputting said comparator pulses from a negative polarity output terminal when said inhibiting signal is at the high level, and holding said positive polarity output terminal at a low level and said negative polarity output terminal at a high level when said inhibiting signal is at the low level;

trigger and reset means, coupled to said positive polarity output terminal of said inhibiting AND means, through a trigger input terminal, and first AND means, through a reset input terminal, for outputting a first signal that rises as said comparator pulses rise and which level is constant, when said comparator pulses are input through said trigger input terminal, and for outputting reset pulses when a high level signal is input through said reset input terminal from said first AND circuit;

timing control means, coupled to said trigger and reset means, for generating a sawtooth wave, which is derived from said constant level signal supplied from said trigger and reset means, which returns to a fixed level when a reset pulse is supplied to said timing control means, and for comparing said sawtooth wave with a slicing level that increases as said linear velocity of said optical disk memory increases and for outputting a timing pulse signal that drops from a high level to a low level as said sawtooth wave crosses said slicing level when said sawtooth wave is decaying, and that rises from the low level to the high level when a reset pulse is input said timing control means, a duty factor of said timing pulse signal increases and approaches 50% as said linear velocity of said optical disk memory increases;

output means, coupled to said timing control means, for outputting said timing pulse signal from a positive polarity output terminal, and for outputting an inverted timing pulse signal, from a negative polarity output terminal through buffer amplifier means, as said laser driving pulses;

latch means for holding an 8-bit digital data which is indicative of said slicing level of said timing control means and for outputting a latch signal in accordance with a predetermined timing signal;

D/A converter means, coupled to said latch means, for converting said latch signal into an analog signal, and for outputting said analog signal as said slicing level to said timing control means; and second AND means, coupled to said positive polarity output terminal of said output means and said positive polarity output terminal of said inhibiting AND means, for outputting said comparator pulses from said inhibiting AND means when said timing pulses signal is of a high level, said first AND means receiving said comparator pulses output from said second AND means, through integration means, and being coupled to said negative polarity output terminal of said inhibiting AND circuit, generating and outputting a logical AND of these inputs.

7. The video signal recording/reproducing device in accordance with claim 6, wherein said pulse width adjusting means is comprises of said first AND means, said second AND means, said integration means, said trigger and reset means, said timing control means, said D/A converter means, said latch means and said output means.

* * * * *